United States Patent
Zeibig et al.

(10) Patent No.: US 12,030,384 B1
(45) Date of Patent: Jul. 9, 2024

(54) HYBRID DRIVE SYSTEM AND VEHICLE

(71) Applicant: MERCEDES-BENZ GROUP AG, Stuttgart (DE)

(72) Inventors: Jonathan Zeibig, Aalen (DE); Carsten Gitt, Stuttgart (DE); Tobias Schilder, Ludwigsburg (DE); Peter Hahn, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/290,343

(22) PCT Filed: Apr. 12, 2022

(86) PCT No.: PCT/EP2022/059773
§ 371 (c)(1),
(2) Date: Nov. 13, 2023

(87) PCT Pub. No.: WO2022/238075
PCT Pub. Date: Nov. 17, 2022

(30) Foreign Application Priority Data

May 14, 2021 (DE) ............ 10 2021 002 533.4

(51) Int. Cl.
*B60K 6/36* (2007.10)
*B60K 6/365* (2007.10)
(Continued)

(52) U.S. Cl.
CPC .............. *B60K 6/365* (2013.01); *B60K 6/387* (2013.01); *B60K 6/48* (2013.01)

(58) Field of Classification Search
CPC ........... B60K 6/365; B60K 6/387; B60K 6/48
See application file for complete search history.

(56) References Cited

U.S. PATENT DOCUMENTS

2007/0287564 A1* 12/2007 Cho ................ B60W 10/02
475/5
2016/0101772 A1 4/2016 Maeda
(Continued)

FOREIGN PATENT DOCUMENTS

DE 102010052262 A1 6/2012
DE 102013226474 A1 6/2015
(Continued)

OTHER PUBLICATIONS

International Search Report and Written Opinion mailed Jul. 20, 2022 in related/corresponding International Application No. PCT/EP2022/059773.
(Continued)

*Primary Examiner* — Jacob S. Scott
*Assistant Examiner* — Farhana Pervin
(74) *Attorney, Agent, or Firm* — PATENT PORTFOLIO BUILDERS PLLC

(57) ABSTRACT

A hybrid drive system has an internal combustion engine, electric engine, and transmission having a first spur gear section and a second spur gear section, which provide output via at least one layshaft, and a four-shaft planetary transmission, which has a first planetary gear set having a first sun gear, a first planetary carrier and a first annular gear, and a second planetary gear set having a second sun gear, a second planetary carrier and a second annular gear. The first annular gear is couplable with a crankshaft of the internal combustion engine. The first sun gear is permanently connected to the second annular gear fixed against rotation. A rotor of the electric engine is couplable with the second annular gear fixed against rotation. The first planetary carrier is permanently connected to the second planetary carrier fixed against rotation. A first input shaft of the first spur gear section rotatable around a main axis of rotation is connected to the second planetary carrier fixed against rotation.

10 Claims, 2 Drawing Sheets

(51) Int. Cl.
 _B60K 6/387_ (2007.10)
 _B60K 6/48_ (2007.10)

(56) References Cited

U.S. PATENT DOCUMENTS

| | | | | |
|---|---|---|---|---|
| 2016/0368361 | A1* | 12/2016 | Endo | F16H 1/46 |
| 2020/0001860 | A1* | 1/2020 | Rumetshofer | B60K 6/48 |
| 2021/0146768 | A1* | 5/2021 | Wiener | F16H 57/02 |
| 2021/0207688 | A1* | 7/2021 | Hwang | B60K 6/387 |
| 2022/0410691 | A1* | 12/2022 | Gültlinger | B60K 6/387 |

FOREIGN PATENT DOCUMENTS

| | | |
|---|---|---|
| DE | 112013006936 T5 | 1/2016 |
| DE | 102016213709 A1 | 2/2018 |
| DE | 102017203478 A1 | 9/2018 |
| DE | 102017006082 A1 | 1/2019 |
| DE | 102018007154 A1 | 4/2019 |
| DE | 102018213876 A1 | 2/2020 |
| DE | 102019007235 A1 | 4/2021 |
| JP | 2017030375 A | 2/2017 |

OTHER PUBLICATIONS

Office Action created Jan. 18, 2022 in related/corresponding DE Application No. 10 2021 002 533.4.

\* cited by examiner

| | iVM | SA | SB | SK |
|---|---|---|---|---|
| G1 | 14 | x | - | x |
| V2 | 10 | x | - | - |
| V3 | 7 | x | - | - |
| G4 | 5 | x | x | - |
| V5 | 4 | - | x | - |
| V6 | 3 | - | x | - |
| G7 | 2 | - | x | x |

HYBRID DRIVE SYSTEM AND VEHICLE

BACKGROUND AND SUMMARY OF THE INVENTION

Exemplary embodiments of the invention relate to a hybrid drive system having an internal combustion engine, an electric engine, and a transmission having a first spur gear section and a second spur gear section, which provide output via at least one layshaft, and having a four-shaft planetary transmission. Exemplary embodiments of the invention additionally relate to a vehicle having such a hybrid drive system.

Hybrid drive systems, respectively having a planetary transmission and at least one spur gear section, are known from DE 10 2018 007 154 A1, DE 10 2017 203 478 A1, DE 10 2016 213 709 A1, DE 11 2013 006 936 T5 and DE 10 2018 213 876 A1.

For example, DE 10 2017 006 082 A1 (of the applicant) describes a conventional hybrid drive system for a vehicle having an internal combustion engine and an electric engine. A four-shaft planetary gear transmission having two planetary gear sets is used, via which the electric engine and the internal combustion engine are coupled into the transmission of the hybrid drive system and to which two spur gear sections are connected.

However, the structure in the specified prior art has a high complexity while implementing many functions, and requires for this purpose a very large amount of installation space, in particular in the axial direction, and thus in the direction of a main transmission axle or of input shafts of the two spur gear sections.

Exemplary embodiments of the present invention are directed to disclose a simple structure that is, in particular, very compact in the axial direction and has a large number of useful transmission functions.

The hybrid drive system according to the invention serves, in particular, as a vehicle drive. It comprises an internal combustion engine and at least one electric engine, and a transmission having two spur gear sections and a four-shaft planetary transmission. In the planetary transmission, two planetary gear sets are provided, wherein a first planetary gear set is designed having a first sun gear, a first planetary carrier, and a first annular gear and a second planetary gear set is designed having a second sun gear, a second planetary carrier, and a second annular gear. The first annular gear is coupled with a crankshaft of the internal combustion engine or can preferably be coupled via a disconnect clutch and optionally via a torsional vibration damper. The first sun gear is permanently connected to the second annular gear in a manner fixed against rotation and is or can be coupled directly or indirectly with a rotor of the electric engine in a manner fixed against rotation via a further transmission element, the rotor being or being able to be coupled with the second annular gear in turn. The two planetary carriers of the planetary gear sets are permanently connected to each other in a manner fixed against rotation and additionally to a first input shaft of the first spur gear section that can be rotated around a main axis of rotation of the transmission. A second input shaft of the second spur gear section that can be rotated around the main axis of rotation of the transmission is connected in turn to the second sun gear in a manner fixed against rotation. It is now the case that the first and the second spur gear section respectively have exactly one spur gear pairing in order to thus realize a simple and compact structure. A blocking switch element for connecting two of the four shafts of the planetary transmission in a manner fixed against rotation is further provided to enable a high degree of flexibility when choosing as large as possible a number of gears. In particular, the transmission ratio of one spur gear section can for this purpose be much greater than that of the other spur gear section.

In the context of the invention, fixed against rotation should be understood to mean that a connection or coupling in a manner fixed against rotation of two rotatably mounted elements means that these two elements are arranged coaxially with each other and are connected to each other such that they revolve at the same angular velocity. In the context of the present invention, axial or along the main axis of rotation always means axial in relation to this main axis of rotation, which coincides in turn with the axes of rotation of the two coaxial input shafts of the spur gear section.

Via the structure described of the hybrid drive system according to the invention, an inverse connection of the spur gear section is generated in comparison with the previous concepts. It is thus possible to force the electric engine into an operation rotating in reverse. This ultimately leads to two zero crossings of the rotational speed of the electric engine, which can optimally be used as additional stages in the sense of virtual gears.

The forced reversal of rotational speed also improves the otherwise rather poor rotational speed ratio between the internal combustion engine on the one hand and the electric engine on the other hand in the intermediate gear. Whereas the two engines could not previously be optimally used, it is now possible to implement a design in which the internal combustion engine and the electric engine have the same transmission ratio in the intermediate gear, such that the two machines can be used as effectively as possible.

Very high efficacy can further be generated in particular in the higher gears, which in turn has a very positive effect on the efficiency and thus ultimately on the efficacy and the energy consumption of the hybrid drive system according to the invention.

According to a very advantageous development of the hybrid drive system according to the invention, the two spur gear pairings of, respectively, the first spur gear section on the one hand and the second spur gear section on the other hand are arranged in relation to each other such that a blocking switch element for blocking two of the shafts of the planetary transmission is arranged between the two spur gear pairings when viewed in an axial direction along the two input shafts of the respective spur gear section.

An exceptionally compact structure at a very high gear ratio spread, and thus very significantly different transmission ratios between the fastest and the slowest gear thus becomes possible in the axial direction. By using the four-shaft planetary transmission, the internal combustion engine and the electrical engine in the described arrangement, a plurality of functions can thus be easily and efficiently implemented with the hybrid drive system according to the invention.

According to an exceptionally favorable development of the hybrid drive device according to the invention, it can be provided that exactly one layshaft is provided in parallel with the main axis of rotation and having an output gear connected to said layshaft in a manner fixed against rotation. The exactly one layshaft allows a very compact structure of the transmission transverse to the axial direction.

According to a very advantageous development of the output gear, the output gear can be arranged between the planetary transmission and the two spur gear sections when viewed axially, and thus along the main axis of rotation.

As already indicated above, according to a very advantageous embodiment of the hybrid drive system according to the invention, the internal combustion engine or its crankshaft can be connected to the first annular gear of the planetary transmission via a disconnect clutch. In addition, or also compactly integrated with the disconnect clutch, a dual-mass flywheel for damping or eliminating torsional vibrations can be provided. Alternative structures of torsional vibration dampers are also conceivable. The disconnect clutch itself allows a purely electric operation by separating the transmission or its planetary transmission from the internal combustion engine, which correspondingly increases the possibility of increasing the functionality of the hybrid drive system according to the invention. The disconnect clutch itself can be designed to have a form-fit or friction-fit. It can, in particular, also be designed to have a form-fit without synchronization so that it can thus be particularly simple and compact in its structure. If required, the rotational speeds can be adjusted via the electric engine.

The electric engine and/or a rotor gear of the rotor of the electric engine are arranged overlapping the planetary gear set when viewed in the axial direction. This arrangement of the electric engine, which is preferably arranged axially in parallel with the input axes of the two spur gear section and the crankshaft, also enables a very compact structure in the axial direction. According to an advantageous development, the electric engine can be connected via further transmission elements such as a spur gear transmission, a belt drive, a chain drive, or the like.

An exceptionally favorable development of the hybrid drive system according to the invention can provide that a switch element for the first spur gear section is arranged coaxially with the layshaft and axially between the spur gear pairings. Such an arrangement of a switch element for the first spur gear section coaxial with the layshaft thus uses a fixed gear in the region of the input shaft in the first spur gear pairing, and correspondingly an idler gear on the at least one, according to the embodiment described above on the exactly one, layshaft. In principle, such a switch element could be arranged coaxially to the layshaft on the layshaft in any axial position. Particularly preferably, it is located between the two spur gear pairings. The first switch element then uses the same installation space in the axial direction as the blocking switch element, such that no additional installation space is required in the axial direction.

In the context of the present invention, coaxial means a rotatably mounted element coaxial with another rotatably mounted element, e.g., a shaft, such that the axes of rotation of the two elements are respectively congruent or flush. According to the invention, it is further the case that a gear pairing or spur gear pairing should be understood to mean a number of two gear wheels or spur gears interlocking with each other, the gear wheels or spur gears having parallel axes of rotation and being arranged in a shared plane, described as a gear set plane, which is perpendicular to these axes of rotation.

According to an exceptionally favorable development, a second switch element is also located coaxially to the layshaft and in the axial direction between the spur gear pairings. The idler gear would thus also be located on the layshaft in the other spur gear pairing.

According to a very favorable development of these ideas, the two switch elements can be designed as a coupling switch element and can be switched with a single shared sliding sleeve in order, on the one hand, to obtain as simple as possible a structure that is as compact as possible in the axial direction and, on the other hand, to further reduce complexity with regard to the components and the actuating elements.

In the vehicle according to the invention, it is the case that the vehicle has a hybrid drive system according to one of the embodiments described above, wherein, in addition, an electric drive system is provided, which is designed mechanically independently of the hybrid drive system. The drive can thus be very flexibly implemented. For example, an electric reverse gear can thus be implemented, such that the transmission need not provide such a reverse gear. It is further provided that one axle of the vehicle is driven by the hybrid drive system, while the electric drive system drives another axle of the vehicle, in order, for example, to thus use one axle for startup and reversing in the purely electric operation and the other axle for propulsion with the hybrid drive system. In addition, both axles can be used where required to thus obtain an all-wheel drive system, for example when used in a passenger car.

The structure also allows power generated in the generating operation of the electric engine in the hybrid drive system to be transmitted to the purely electric drive system, such that its operation is not dependent on the state of charge of the battery. In the hybrid drive system according to the invention, huge generation ranges of the electric engine of the hybrid drive system result. In combination with the second purely electrically driven axle, the ranges can now be used for additional rotational speed adjustments of the internal combustion engine. As mentioned, power can be directly fed from the electric engine of the hybrid drive system to the electric engine of the purely electrically driven axle. The entire structure can be driven without a battery or, as mentioned, is independent of the state of charge of the battery. Further operating points of the internal combustion engine can thus further be implemented. A further advantage, which primarily becomes evident in this structure of the vehicle, is the relatively large spread from the first to the last fixed gear within the transmission of the hybrid drive system according to the invention. Due to this large spread of the fixed or mechanical gears and the possibility of creating the additional torque stages in the form of the virtual gears in between, it is possible, especially in combination with the purely electrically driven axle, to use the hybrid drive system according to the invention in a plurality of different vehicles having very different requirements of their drive, for example due to very significantly different sizes, weights, and the like. The hybrid drive system according to the invention can thus be flexibly used in different model series without a need for significant adjustments to construction and technical developments, which makes the use of the hybrid drive system according to the invention in such a vehicle exceptionally efficient and cost-efficient.

Further advantageous developments of the hybrid drive system according to the invention result from the two exemplary embodiments, which are described in more detail in the following with reference to the figures.

BRIEF DESCRIPTION OF THE DRAWING FIGURES

Here:

DETAILED DESCRIPTION

Figures 1, 2:
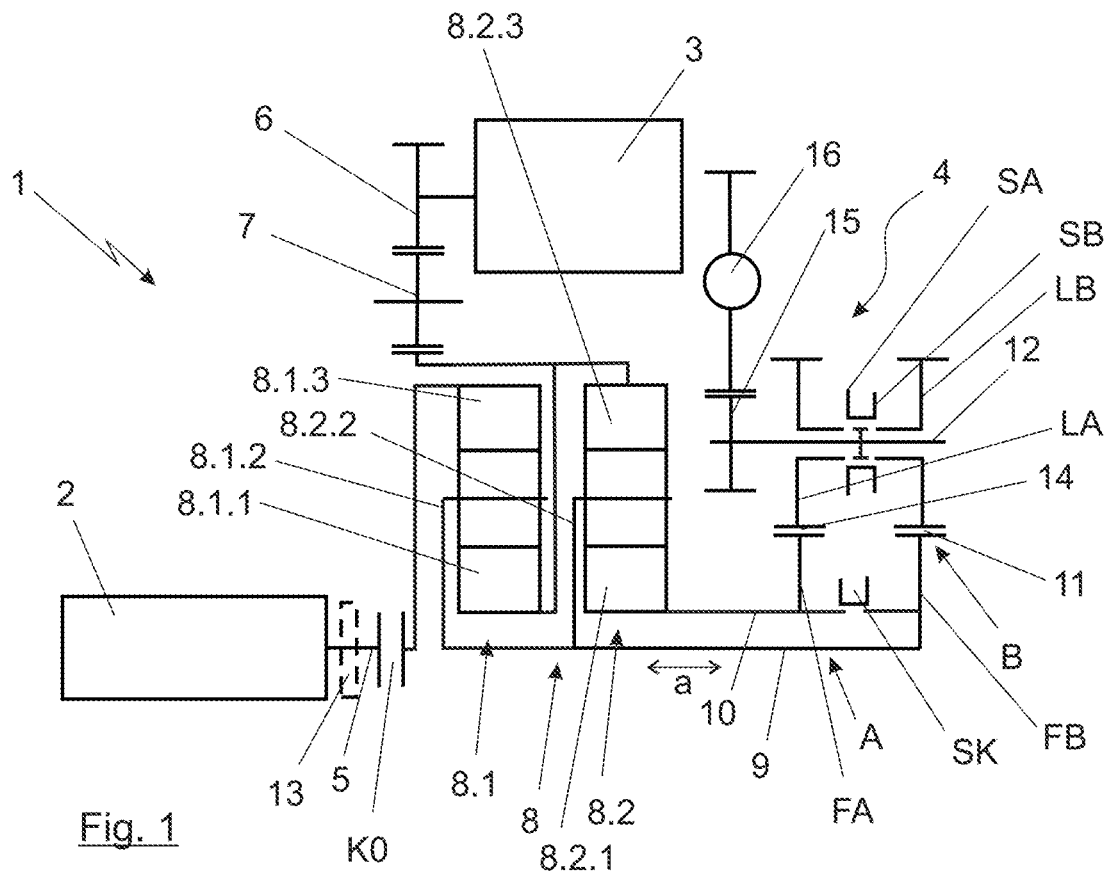
FIG. 1 shows a schematic depiction of a possible embodiment of the hybrid drive system according to the invention.
FIG. 2 shows a switching table to explain the possible states of the hybrid drive system according to the invention in FIG. 1.

FIG. 1 illustrates a hybrid drive system 1 comprising an internal combustion engine 2 and an electric engine 3. A rotor of the electric engine 3 is connected to a rotor gear 6 in a manner fixed against rotation, which is connected via an intermediate gear 7 as a transmission element to a four-shaft planetary transmission 8 of a transmission labelled 4 as a whole. Only the top half of the transmission 4 is depicted in relation to its main axis of rotation.

The four-shaft planetary transmission 8 comprises a first planetary gear set 8.1 and, axially adjacent thereto, a second planetary gear set 8.2. The first planetary gear set 8.1 comprises a first sun gear 8.1.1, a first planetary carrier 8.1.2 having several planets, of which, additionally, only one is depicted. A first annular gear 8.1.3 forms the outer end in the peripheral direction. The structure of the second planetary gear set 8.2 corresponds to this first annular gear. It has a second sun gear 8.2.1, a second planetary carrier 8.2.2 and a second annular gear 8.2.3.

The first annular gear 8.1.3 of the first planetary gear set 8.1 can be connected to a crankshaft 5 of the internal combustion engine 2 via a disconnect clutch KO and an optional torsional vibration damper 13. When the disconnect clutch KO is closed, the disconnect clutch KO preferably is able to be designed as a form-fit clutch without synchronization, the internal combustion engine 2 or its crankshaft 5 can thus be coupled as required with the first annular gear 8.1.3 in a manner fixed against rotation. The two planetary gear carriers 8.1.2 and 8.2.2 are coupled in a manner fixed against rotation with each other on one side and with a first input shaft 9 on the other side. This first input shaft 9 drives a first fixed gear FB, which is arranged coaxially and in a manner fixed against rotation to said first input shaft and drives a first idler gear LB, together forming a first spur gear pairing 11. This first spur gear pairing 11 is the only spur gear pairing of the first spur gear section B, of which the first idler gear LB is arranged coaxially with a layshaft 12 and, as required, can be connected to said layshaft in a manner fixed against rotation via a first switch element SB. The second spur gear section A comprises a fixed gear FA on the second input shaft 10, which is coaxial with the first input shaft 9. This second input shaft is permanently connected to the second sun 8.2.1 of the second planetary gear set 8.2 of the planetary transmission 8 in a manner fixed against rotation. The second input shaft 10 is designed as an annular gear around the first input shaft 9. A second idler wheel LA arranged coaxially with the layshaft 12 completes a second spur gear pairing 14, and thus the second spur gear section A, which exclusively comprises this one spur gear pairing, specifically the second spur gear pairing 14. Via a second switch element SA, the second idler gear LA can be connected as required to the layshaft 12 in a manner fixed against rotation.

The planetary transmission 8, the first input shaft 9 and the second input shaft 10 are all advantageously arranged coaxially with each other or have the same axis of rotation.

The layshaft 12 supports, in turn, an output gear 15 in a portion in the axial direction a, which always relates to the main axis of rotation of the transmission 4. This output gear meshes with a differential 16 (indicated schematically here) via which a driven axle 23 of a vehicle 21 (cf. FIG. 4) equipped with the hybrid drive system 1 is driven.

The output gear 15 is located between the planetary transmission 8 and the second spur gear section A. The differential 16 can thus slide axially at least partially next to the electric engine 3. They could also axially overlap, however, which cannot, however, be represented by the wheel set diagram of FIG. 1 showing everything in one plane. The differential 16 can thus move as close as possible to the internal combustion engine 2, which represents an advantage with regard to the installation space.

As an alternative, in the case of corresponding diameters of the planetary transmission 8 and the spur gear pairings 11, 14, it would be possible to design the arrangement of the output gear 15, which is connected to the layshaft 12 in a manner fixed against rotation, to axially overlap the planetary gear set 8. The differential 16 could thus move very close to the internal combustion engine 2, which advantageously facilitates the compact structure and the ideal use of the installation space typically present in the vehicle 21.

An installation transverse to the direction of travel of the vehicle 21 in particular thus becomes easily possible via both variants.

The first switch element SB and the second switch element SA are combined in the exemplary embodiment depicted to form a combined coupling switch element. Besides the embodiment of these two switch elements SA, SB as friction switch elements, which would also be possible in principle, this variant, with a design of the two switch elements SA and SB as a combined switch element having a shared sliding sleeve and a form-fit switch via a single actuator, is ideal. With regard to the arrangement, it can preferably, as depicted here, be arranged on the side of the second spur gear pairing 14 facing away from the planetary transmission 8, and thus between the two spur gear pairings 11, 14 on the layshaft 12. The first, the second or both of the two spur gear pairings 11, 14 can thus optionally be connected to the output gear 15.

Two of the elements of the planetary gear transmission 8, in the exemplary embodiment depicted here the two planetary gear carriers 8.1.2 and 8.2.2 and the first input shaft 9 connected to them and the second sun gear 8.2.1 connected to the second input shaft 10 in a manner fixed against rotation, can be connected to each other via a blocking switch element SK, which is here preferably designed in turn as a form-fit switch element without synchronization. At the corresponding rotational speed of the elements, such a relative movement between the elements of the planetary transmission 8 can be implemented by connecting the planetary carrier 8.1.2 and 8.2.2 to the second sun gear 8.2.1. The planetary transmission 8 then revolves as a block, for which reason the switch element SK is conventionally described as a blocking switch element SK. The block switching element SK connects the two input shafts 9, 10 or the second input shaft 10 and the fixed gear FB of the first spur gear section B connected to the first input shaft 9 in a manner fixed against rotation. It is arranged such that it is located in the same installation space in the axial direction a as the two switch elements SA, SB. Additional installation space for this blocking switch element SK can thus be saved in the axial direction a, and the entire structure of the transmission 4 can be implemented correspondingly compactly.

The two spur gear sections A, B can now preferably have very significantly different transmission ratios, wherein the transmission ratio of the second spur gear section A should be much greater than that of the first spur gear section B.

This enables a large spread of the mechanical gears and thus permits a correspondingly wide spread of the useful gears of the hybrid drive system 1 at high efficiency. FIG. 2 illustrates a switching table. In the first column, gears are specified. A first gear is labelled G1. The latter is a mechanical fixed gear, which is then followed by a second gear V2 and a third gear V3 that are designed as virtual gears, which can be generated as intermediate gears by a corresponding use of the electric engine 3, which is explained in more detail in the following. A fourth gear G4 is designed once again as a fixed gear, a fifth gear V5 and a sixth gear V6 are then designed in turn as virtual gears. Finally, a seventh gear G7 in the form of a fixed gear follows.

In the second column, a total transmission ratio of the internal combustion engine between the first annular gear 8.1.3 and the layshaft 12, and thus ultimately between the crankshaft 5 of the internal combustion engine 2 and the output, is represented by the abbreviation iVM. In the first gear G1, this transmission ratio has a value of 14, and then reduces until the seventh gear G7 to a value of 2. The three following columns respectively show the position of the switch elements SA, SB and of the blocking switch element SK. An engaged switch element is labelled "x" and a disengaged switch element is labelled "-". In the first gear G1, the planetary transmission 8 is thus correspondingly blocked, and the second switch element SA of the second spur gear section A is closed, such that output is provided via the latter. For the second gear V2 and the third gear V3, the blocking switching element SK is then opened, and the second gear V2 and the third gear V3 are implemented by the corresponding operation of the electric engine 3, which is explained in more detail with reference to the following figure, while the position of the switch elements SA, SB remains unchanged.

For the next fixed gear, the fourth gear G4, the first switch element SB is then engaged in addition to the second switch element SA. The second switch element SA is then opened for the fifth gear V5, and the fifth and sixth gears V5, V6 are in turn implemented via the electric engine. For the final fixed gear, the seventh gear G7, the blocking switch element SK is then closed in addition to the closed first switch element SB.

Figure 3:
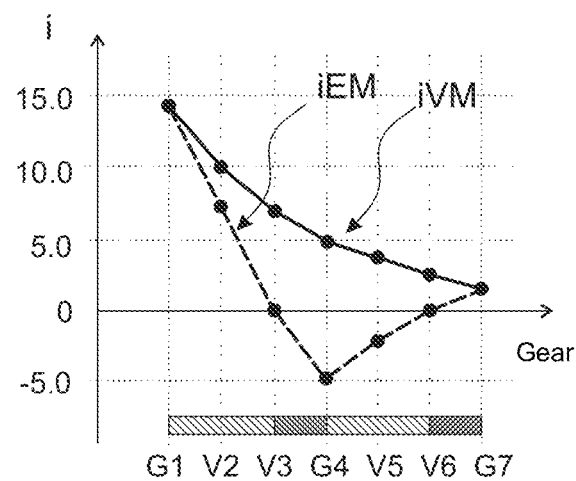
FIG. 3 shows a diagram of the course of the total transmission ratio of the hybrid drive system and the transmission ratio of the electric engine over the gears.

In the depiction of FIG. 3, this sequence of switches is shown again, wherein the total transmission ratio of the internal combustion engine is depicted corresponding to the table in FIG. 2 with a solid line and once again labelled iVM, while a total transmission ratio of the electric engine between the first sun gear 8.1.3, and thus the connection of the electric engine in the planetary transmission 8, and the layshaft 12 is depicted with a dashed line and the label iEM. The generating operation of the electric engine 3 is depicted with hatched blocks, and its motor operation with cross-hatched blocks. To obtain the total transmission ratio of the internal combustion engine represented by a solid line in the sense of the table specified above, this means for the individual gears G1, G2, G3, G4, G5, G6, G7 represented on the x axis that, in the first two gears G1 and V1, the electric engine 3 rotates positively and, as represented by the hatched bars, is operated by a generator. Then, in the third virtual gear, the third gear V3, the electric engine will stop, and thus have a rotational speed of zero, and correspondingly a corresponding transmission ratio, as is represented on the y axis. In the fourth gear, the fourth gear G4, the electric engine 3, as is depicted by the cross-hatching, is then operated by a motor, but counter-clockwise, and thus with the opposite sign to previously in the first two gears G1 and V2. For the virtual fifth gear V5, the electric engine 3 then switches back into its generator operation in a still-reversed direction of rotation, before in turn being in the sixth virtual gear or the sixth gear V6, and, in the seventh gear G7, is then operated by a motor with a positive direction of rotation, and thus similarly to the previous generator operation in the two first gears G1 and V2.

The region having a negative transmission ratio underneath the zero line on the y axis thus describes a negative direction of rotation, in which the electric engine 3 rotates in the opposite direction to the internal combustion engine 2, both in the motor and in the generator operation, while in the region above the zero line, a positive rotation direction of the electric engine 3 analogous to the rotation direction of the internal combustion engine 2 is implemented, likewise both in the motor and in the generator operation.

Figure 4:
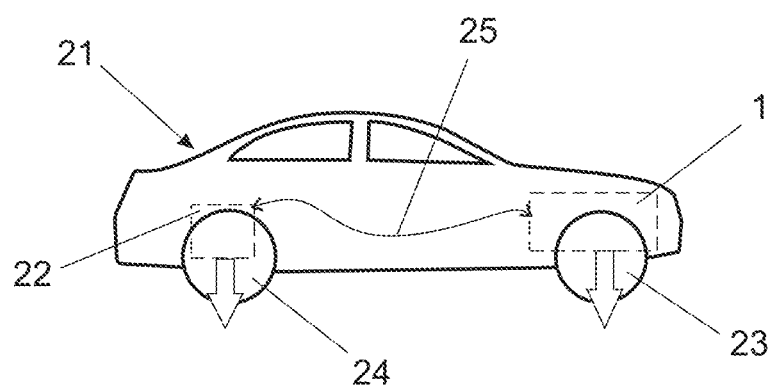
FIG. 4 shows a schematically indicated vehicle having such a hybrid drive system and an additional electric drive system.

The hybrid drive system 1 can in particular be used to drive a vehicle 21 depicted in FIG. 4. The simple structure of the hybrid drive system 1, which requires a reduced number of components, is logical above all in combination with an additional purely electric drive system 22, which can for example form a reverse gear and/or implement the start-up, or support the latter in addition to the hybrid drive system 1. In particular, the hybrid drive system 1 and the electric drive system 22 can be arranged such that one, e.g., here the hybrid drive system 1, drives a first driven axle, e.g., the front axle 23, of the vehicle 22, and the electric drive system 22 drives a different driven axle, here the rear axle 24. A coupling of the two systems 1, 22 indicated via the double arrow 25 is then implemented purely electrically via a drive control system (not depicted) and a battery system (also not depicted).

It is still possible to electrically support the drive in the event of a substantially empty battery, as the electric engine 3 of the hybrid system 1 can be operated as a generator via said hybrid system, in order to thus supply the electric drive system 22 with power.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A hybrid drive system, comprising:
   an internal combustion engine;
   an electric engine; and
   a transmission comprising
      at least one layshaft;
      a first spur gear section and a second spur gear section, which provide output via the at least one layshaft; and
      a four-shaft planetary transmission, which has a first planetary gear set having a first sun gear, a first planetary carrier and a first annular gear, and a second planetary gear set having a second sun gear, a second planetary carrier and a second annular gear, wherein the first annular gear is coupled with or is couplable with a crankshaft of the internal combustion engine, the first sun gear is permanently connected to the second annular gear in a manner fixed against rotation, a rotor of the electric engine is coupled with or is couplable with the second annular gear in a manner fixed against rotation, the first planetary carrier is permanently connected to the second planetary carrier in a manner fixed against rotation, a first input shaft of the first spur gear section, which is rotatable around a main axis of rotation, is connected to the second planetary carrier in a manner fixed against rotation, a second input shaft of the second spur gear section, which is rotatable around the main axis of rotation, is connected to the second sun gear in a manner fixed against rotation, the first and the second spur gear sections respectively have exactly one spur gear pairing, and the four-shaft planetary transmission further comprises a blocking switch element configured to connect two of the four shafts of the planetary transmission in a manner fixed against rotation.

2. The hybrid drive system of claim 1, wherein the blocking switch element is arranged between the two spur gear pairings when viewed along the main axis of rotation.

3. The hybrid drive system of claim 1, wherein the at least one layshaft comprises exactly one layshaft arranged in parallel with the main axis of rotation, wherein the exactly one layshaft is coupled with an output gear in a manner fixed against rotation.

4. The hybrid drive system of claim 3, wherein the output gear is arranged between the four-shaft planetary transmission and the spur gear pairings of the first and second spur gear sections when viewed along the main axis of rotation.

5. The hybrid drive system of claim 1, further comprising:
a disconnect clutch configured to couple the crankshaft of the internal combustion engine with the first annular gear.

6. The hybrid drive system of claim 1, wherein the electric engine or a rotor gear, which is connected to the rotor in a manner fixed against rotation, is arranged overlapping with the four-shaft planetary gear transmission when viewed in an axial direction.

7. The hybrid drive system of claim 1, further comprising:
a first switch element arranged coaxially with the at least one layshaft and in an axial direction between the spur gear pairings.

8. The hybrid drive system of claim 7, further comprising:
a second switch element arranged coaxially with the at least one layshaft and in the axial direction between the spur gear pairings.

9. The hybrid drive system of claim 8, wherein the first switch element and the second switch element are coupling switch elements that are switchable with a single shared sliding sleeve.

10. A vehicle, comprising:
a first vehicle axle;
a further vehicle axle; and
an electric drive system coupled to the first and further vehicle axles and configured to drive the first and further vehicle axles, the electric drive system comprising
an internal combustion engine;
an electric engine; and
a transmission comprising
at least one layshaft;
a first spur gear section and a second spur gear section, which provide output via the at least one layshaft; and
a four-shaft planetary transmission, which has a first planetary gear set having a first sun gear, a first planetary carrier and a first annular gear, and a second planetary gear set having a second sun gear, a second planetary carrier and a second annular gear, wherein the first annular gear is coupled with or is couplable with a crankshaft of the internal combustion engine, the first sun gear is permanently connected to the second annular gear in a manner fixed against rotation, a rotor of the electric engine is coupled with or is couplable with the second annular gear in a manner fixed against rotation, the first planetary carrier is permanently connected to the second planetary carrier in a manner fixed against rotation, a first input shaft of the first spur gear section, which is rotatable around a main axis of rotation, is connected to the second planetary carrier in a manner fixed against rotation, a second input shaft of the second spur gear section, which is rotatable around the main axis of rotation, is connected to the second sun gear in a manner fixed against rotation, the first and the second spur gear sections respectively have exactly one spur gear pairing, and the four-shaft planetary transmission further comprises a blocking switch element configured to connect two of the four shafts of the planetary transmission in a manner fixed against rotation.

\* \* \* \* \*